(12) United States Patent
Chen et al.

(10) Patent No.: US 10,095,062 B2
(45) Date of Patent: Oct. 9, 2018

(54) TOUCH DISPLAY DEVICE

(71) Applicant: InnoLux Corporation, Miao-Li County (TW)

(72) Inventors: Jian-Cheng Chen, Miao-Li County (TW); Ming-Jhih Chen, Miao-Li County (TW); Yu-Hsien Wu, Miao-Li County (TW); Yang-Chen Chen, Miao-Li County (TW); Chia-Hsiung Chang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/469,616

(22) Filed: Mar. 27, 2017

(65) Prior Publication Data

US 2017/0307933 A1    Oct. 26, 2017

(30) Foreign Application Priority Data

Apr. 20, 2016    (TW) .............................. 105112255 A

(51) Int. Cl.
| | |
|---|---|
| *G06F 3/041* | (2006.01) |
| *G02F 1/1335* | (2006.01) |
| *G02F 1/1362* | (2006.01) |
| *G09G 3/36* | (2006.01) |

(Continued)

(52) U.S. Cl.
CPC .... *G02F 1/133514* (2013.01); *G02F 1/13338* (2013.01); *G02F 1/133512* (2013.01); *G02F 1/133516* (2013.01); *G02F 1/136209* (2013.01); *G02F 1/136286* (2013.01); *G06F 3/041* (2013.01); *G06F 3/0412* (2013.01); *G09G 3/3607* (2013.01); *G06F 3/044* (2013.01)

(58) Field of Classification Search
CPC .... G06F 3/041; G06F 3/0412; G02F 1/13338; G02F 1/1335; G02F 1/133512; G02F 1/133514; G02F 1/133516; G02F 1/1362; G02F 1/136209; G02F 1/136286; G09G 3/36; G09G 3/3607
See application file for complete search history.

(56) References Cited

U.S. PATENT DOCUMENTS

| | | | |
|---|---|---|---|
| 6,501,529 B1* | 12/2002 | Kurihara ............. | G02F 1/13338 345/173 |
| 2007/0070047 A1* | 3/2007 | Jeon .................... | G02F 1/13338 345/173 |

(Continued)

*Primary Examiner* — Joe H Cheng
(74) *Attorney, Agent, or Firm* — Bacon & Thomas, PLLC

(57) ABSTRACT

A touch display device includes: a second substrate disposed corresponding to a first substrate; a pixel array structure disposed between the first substrate and the second substrate; and a color filter structure disposed between the pixel array structure and the second substrate. Herein, the pixel array structure includes: a scan line extending along a first direction; a data line extending along a second direction, wherein the scan line and the data line are crossed; and a first touch signal line extending along the second direction and overlapping with the data line. The color filter structure includes: a first red unit, a first green unit and a first blue unit arranged along the first direction; and the first touch signal line locates between the first red unit and the first green unit or locates between the first green unit and the first blue unit.

20 Claims, 6 Drawing Sheets

(51) Int. Cl.
*G02F 1/1333* (2006.01)
*G06F 3/044* (2006.01)

(56) References Cited

U.S. PATENT DOCUMENTS

| | | | |
|---|---|---|---|
| 2010/0002162 A1* | 1/2010 | Morimoto | G02F 1/134363 349/38 |
| 2010/0194709 A1* | 8/2010 | Tamaki | G02F 1/13338 345/174 |
| 2012/0327338 A1* | 12/2012 | Kobayashi | G02F 1/133512 349/106 |
| 2014/0152613 A1* | 6/2014 | Ishizaki | G06F 3/0412 345/174 |
| 2015/0036073 A1* | 2/2015 | Im | G02F 1/1333 349/48 |
| 2015/0055072 A1* | 2/2015 | Tsuei | G02F 1/133753 349/128 |
| 2015/0331288 A1* | 11/2015 | Hsieh | G02F 1/134309 349/12 |
| 2016/0120005 A1* | 4/2016 | Wu | H05B 33/26 313/505 |
| 2016/0246135 A1* | 8/2016 | Tae | G02F 1/133753 |
| 2016/0363797 A1* | 12/2016 | Kimura | G06F 3/0412 |
| 2016/0364082 A1* | 12/2016 | Kimura | G06F 3/044 |
| 2017/0153766 A1* | 6/2017 | Kimura | G06F 3/0418 |

* cited by examiner

TOUCH DISPLAY DEVICE

CROSS REFERENCE TO RELATED APPLICATION

This application claims the benefits of the Taiwan Patent Application Serial Number 105112255, filed on Apr. 20, 2016, the subject matter of which is incorporated herein by reference.

BACKGROUND

1. Field

The present disclosure relates to a touch display device and, more particularly, to a touch display device with improved transmittance.

2. Description of Related Art

As display technology advances, all devices are now being developed in smaller sizes with thinner thicknesses and lighter weights. As a result, the mainstream display devices in the market have changed from the previous cathode ray tube to the current liquid crystal display device. In particular, liquid crystal display device can be applied in many fields. For example, most of the display devices used in daily life, such as mobile phones, laptop computers, video cameras, cameras, music players, mobile navigation devices, and televisions, comprise liquid crystal display panels.

In addition, for requirements of humanization and simplification, use of the touch display device equipped with a touch panel are increased in human lives. The use of other input devices such as the keyboard, mouse and remote control is reduced or even eliminated because the users can input signals directly with fingers or by touching the touch panel with other objects to improve the operation convenience for the users.

When the touch units are embedded into the display device to form a touch display device, the touch units may influence the transmittance of the touch display device. Therefore, it is desirable to provide a touch display device with improved transmittance which can meet the requirements of high display quality.

SUMMARY

An object of the present disclosure is to provide a touch display device, wherein a transmittance of the touch display device can be improved by adjusting locations of touch signal lines.

Another object of the present disclosure is to provide a touch display device, wherein a transmittance of the touch display device can be improved by adjusting locations of spacers.

In one embodiment of the present disclosure, the touch display device comprises: a first substrate having a first surface; a second substrate disposed corresponding to the first substrate; a pixel array structure disposed between the first substrate and the second substrate; and a color filter structure disposed between the pixel array structure and the second substrate. The pixel array structure comprises: a scan line extending along a first direction; a data line extending along a second direction, wherein the scan line and the data line are crossed; and a first touch signal line extending along the second direction, wherein the first touch signal line overlaps with the data line. The color filter structure comprises a plurality of pixel units, the plurality of pixel units comprise a first pixel unit, the first pixel unit comprises a first red unit, a first green unit and a first blue unit arranging along the first direction, the first red unit, the first green unit and the first blue unit are projected on the first surface as a first region, a second region and a third region respectively, the first touch signal line is projected on the first surface as a fourth region, and the fourth region locates between the first region and the second region, or the fourth region locates between the second region and the third region.

In the touch display device, a black matrix layer is generally disposed on the second substrate, and light shielding regions of the black matrix layer can cover the scan line, the data line and the first touch signal line. However, in the case that a shift is occurred when assembling the first substrate and the second substrate, the first touch signal line may be exposed from an opening of the black matrix layer on the second substrate resulting in decreasing the transmittance of the touch display device. In other words, a projection region of the first touch signal line on the first surface (i.e. the fourth region) overlaps with a projection region of the opening on the first surface (i.e. the seventh region). In the aforementioned embodiment of the present disclosure, the projection region of the first touch signal line on the first surface (i.e. the fourth region) is designed to overlap with projection regions of the first red unit and the first green unit on the first surface (i.e. overlap with the first region and the second region) or overlap with projection regions of the first green unit and the first blue unit on the first surface (i.e. overlap with the second region and the third region). Hence, even in the case that the shift is occurred when assembling the first substrate and the second substrate, the influence of the exposed first touch signal line on the transmittance of the touch display device can be reduced by adjusting the positions of the first touch signal line.

Moreover, in anther embodiment of the present disclosure, the display device comprises: a first substrate having a first surface; a second substrate disposed corresponding to the first substrate; a pixel array structure disposed between the first substrate and the second substrate; a color filter structure disposed between the pixel array structure and the second substrate; and a first spacer disposed between the pixel array structure and the second substrate. The color filter structure comprises a plurality of pixel units, the plurality of pixel units comprise a first pixel unit and a second pixel unit, the first pixel unit comprises a first blue unit, the second pixel unit comprises a second red unit, wherein the first blue unit and the second red unit are arranged along the first direction. The first blue unit is projected on the first surface as a third region, the first spacer is projected on the first surface as a fifth region, the second red unit is projected on the first surface as a sixth region, wherein the fifth region is adjacent to the third region and the sixth region.

In the aforementioned embodiment, the first spacer can fix the gap distance between the first substrate and the second substrate, and therefore a display quality of a display medium (such as liquid crystal molecules) can be maintained. However, for the liquid crystal molecules, the first spacer is still a protrusion, and this protrusion may influence tilts of the liquid crystal molecules. The irregular tilts of the liquid crystal molecules may result in dark lines, and further decrease the transmittance of the touch display device. Hence, in the display device of the aforementioned embodiment, the influence of the first spacer on the transmittance of the touch display device can be reduced when the projection of the first spacer on the first surface is designed to be locating between the projections of the first blue unit and the second red unit on the first surface.

Other objects, advantages, and novel features of the disclosure will become more apparent from the following detailed description when taken in conjunction with the accompanying drawings.

DETAILED DESCRIPTION OF EMBODIMENT

The following embodiments when read with the accompanying drawings are made to clearly exhibit the above-mentioned and other technical contents, features and effects of the present disclosure. Through the exposition by means of the specific embodiments, people would further understand the technical means and effects the present disclosure adopts to achieve the above-indicated objectives. Moreover, as the contents disclosed herein should be readily understood and can be implemented by a person skilled in the art, all equivalent changes or modifications which do not depart from the concept of the present disclosure should be encompassed by the appended claims.

Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

Figure 1:
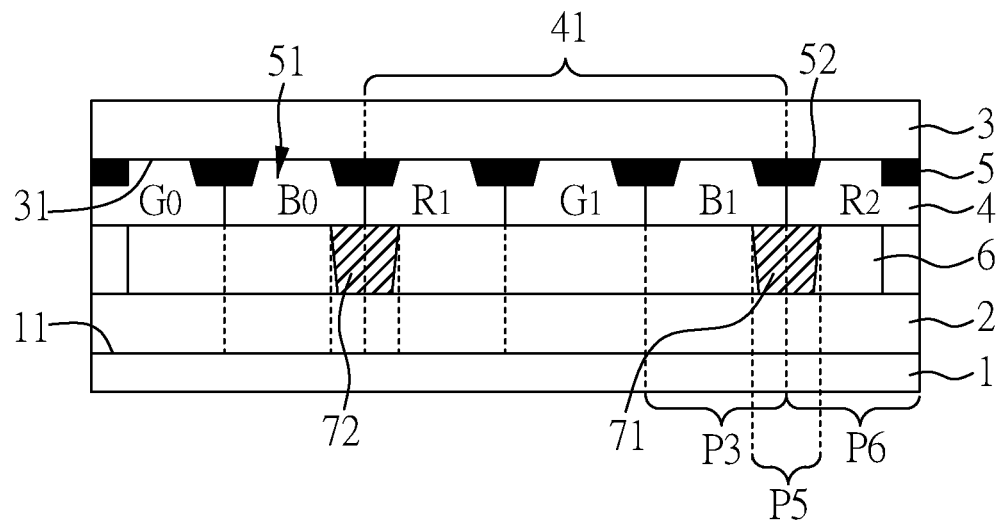
FIG. 1 is a cross-sectional view showing a touch display device according to one embodiment of the present disclosure.
Figure 2:
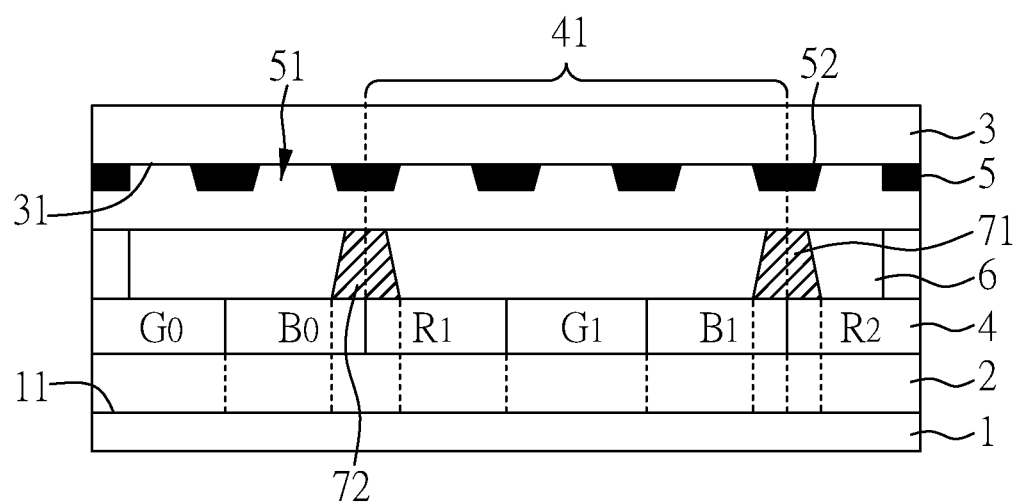
FIG. 2 is a cross-sectional view showing a touch display device according to another embodiment of the present disclosure.

FIGS. 1 and 2 are cross-sectional views showing a touch display devices according to two different embodiments of the present disclosure respectively. As shown in FIG. 1, the touch display device of the present embodiment comprises: a first substrate 1 having a first surface 11; a second substrate 3 having a second surface 31 and disposed corresponding to the first substrate 1; a display medium layer 6 disposed between the first substrate 1 and the second substrate 3; and a first spacer 71 and a second spacer 72 disposed between the first substrate 1 and the second substrate 3 to fix the gap distance between the first substrate 1 and the second substrate 3.

In the present embodiment, the first spacer 71 and the second spacer 72 may comprise photoresist.

In the present embodiment, the first substrate 1 and/or the second substrate 3 may comprise any substrate material such as glass, plastic, flexible materials, or thin films. When the first substrate 1 and/or the second substrate 3 comprise plastic, flexible materials or thin films, a flexible touch display device can be obtained.

The display medium layer 6 may comprise liquid crystal (LC), quantum dot (QD), fluorescence, organic light emitting diode (OLED), micro light emitting diode (micro LED), or a combination of the materials mentioned above, but the present disclosure is not limited thereto. If the display medium layer 6 comprises liquid crystal, the obtained touch display device is a touch liquid crystal display (LCD) device. If the display medium layer 6 comprises QD, the obtained touch display device is a touch QD display device. If the display medium layer 6 comprises fluorescence, the obtained touch display device is a touch fluorescence display device. If the display medium layer 6 comprises OLED, the obtained touch display device is a touch OLED display device. If the display medium layer 6 comprises micro LED, the obtained touch display device is a touch micro LED display device. If the first substrate 1 and/or the second substrate 3 used in the touch display device mentioned above comprises plastic, flexible materials or thin films, a flexible touch LCD device, a flexible touch QD display device, a flexible touch fluorescence display device, a flexible touch OLED display device or a flexible touch micro LED display device can be obtained. In addition, in another embodiment of the present disclosure, if the first substrate 1 comprises plastic, flexible materials or thin films and the display medium layer 6 comprises OLED or micro LED, the second substrate 3 can be a protective film, but the present disclosure is not limited thereto.

In the following embodiment, the display medium layer 6 comprises liquid crystal as an example, but the present disclosure is not limited thereto.

Herein, various units can be disposed on the first surface 11 of the first substrate 1 and/or the second surface 31 of the second substrate 3. For example, as shown in FIG. 1, a pixel array structure 2 can be disposed between the first substrate 1 and the second substrate 3, wherein the pixel array structure 2 may comprise scan lines and data lines, and the first substrate 1 can be served as a thin film transistor substrate. A color filter structure 4 can be formed on the second surface 31 of the second substrate 3, and the second substrate 3 can be served as a color filter substrate. Alternatively, as shown in FIG. 2, the color filter structure 4 can be formed on the pixel array structure 2; and in this case, the first substrate 1 and the units disposed thereon can form a color filter on array (COA) substrate. As shown in FIG. 2, the color filter structure 4 is disposed between the pixel array structure 2 and the second substrate 3. In other embodiment, the color filter structure 4 can be disposed between the pixel array structure 2 and the first substrate 1, but the present disclosure is not limited thereto. It is to be noted that the use of the term "on", such as disposed on or formed on, could represent two elements direct contact to each other, or a third element locates between the two elements.

Except for the position of the color filter structure 4, the touch display devices shown in FIGS. 1 and 2 have other differences. In the touch display device shown in FIG. 1, the first spacer 71 and the second spacer 72 are formed on the second substrate 3, followed by assembling the first substrate 1 and the second substrate 3; therefore, the first spacer 71 and the second spacer 72 have inverted trapezoidal shapes. In the touch display device shown in FIG. 2, the first spacer 71 and the second spacer 72 are formed on the first substrate 1, followed by assembling the first substrate 1 and the second substrate 3; therefore, the first spacer 71 and the second spacer 72 have trapezoidal shapes. In the present disclosure, the shapes of the first spacer 71 and the second spacer 72 are not limited, as long as the first spacer 71 and the second spacer 72 are disposed between the first substrate 1 and the second substrate 3 to fix the gap distance between the first substrate 1 and the second substrate 3.

Hereinafter, the relations between the pixel array structure 2 and the color filter structure 4 are described below. Since the relations between the pixel array structure 2 and the color filter structure 4 in the touch display devices shown in FIGS. 1 and 2 are similar, only the touch display device shown in FIG. 1 is illustrated below.

Figure 3:
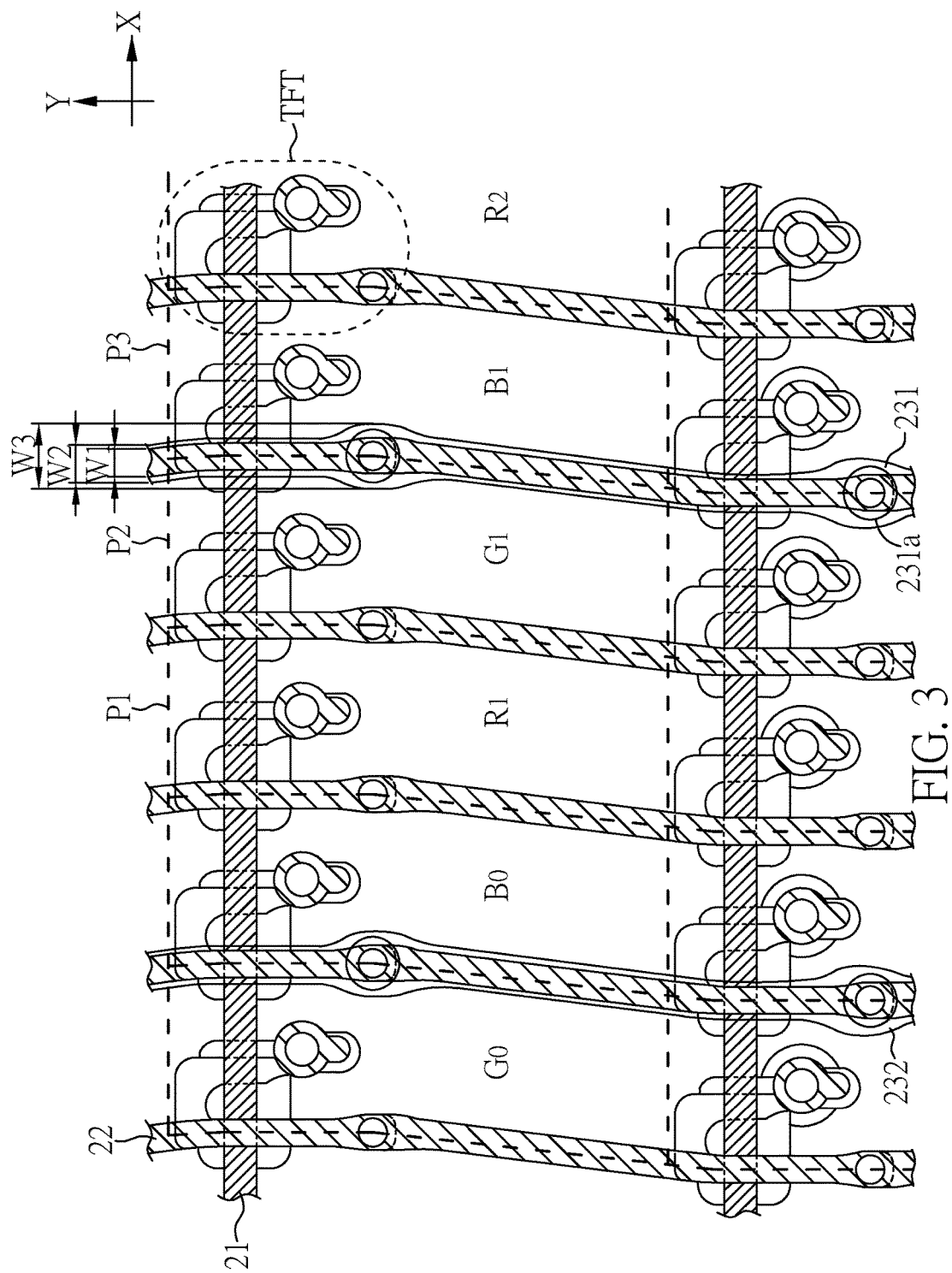
FIG. 3 is a top view showing a pixel array structure on a first substrate of a touch display device according to one embodiment of the present disclosure.

FIG. 3 is a top view showing a pixel array structure on a first substrate of a touch display device according to one embodiment of the present disclosure. As shown in FIGS. 1 and 3, the touch display device of the present embodiment comprises: a first substrate 1 having a first surface 11; a second substrate 3 disposed corresponding to the first substrate 1; a pixel array structure 2 disposed between the first substrate 1 and the second substrate 3; and a color filter structure 4 disposed between the pixel array structure 2 and the second substrate 3, wherein the color filter structure 4 is disposed on the pixel array structure 2 or on a side of the second substrate 3 facing to the first substrate 1. In FIG. 1, the color filter structure 4 is disposed on the second surface 31 of the second substrate 3. As shown in FIG. 3, the pixel array structure 2 comprises: a scan line 21 extending along a first direction X; a data line 22 extending along a second direction Y, wherein the scan line 21 and the data line 22 are crossed; and a first touch signal line 231 extending along the second direction Y, wherein at least part of the first touch signal line 231 overlaps with the data line 22 from top view. Herein, the first direction X and the second direction Y are different. For example, the first direction X may be perpendicular to the second direction Y or an angle (such as 75-90 degree or 80-90 degree) is included between the first direction X and the second direction Y.

As shown in FIGS. 1 and 3, in the touch display device of the present embodiment, the color filter structure 4 comprises a plurality of pixel units 41, the plurality of pixel units 41 comprise a first pixel unit, the first pixel unit comprises a first red unit R1, a first green unit G1 and a first blue unit B1 arranging along the first direction X. In the present embodiment, the first red unit R1, the first green unit G1 and the first blue unit B1 are sequentially arranged along the first direction X, but the present disclosure is not limited thereto. In other embodiments, the first red unit R1, the first green unit G1 and the first blue unit B1 can be randomly arranged along the first direction X. In the touch display device shown in FIG. 1, the first red unit R1 is adjacent to the first green unit G1, and the first blue unit B1 is adjacent to the first green unit G1.

As shown in FIGS. 1 and 3, the first red unit R1, the first green unit G1 and the first blue unit B1 are projected on the first surface 11 as a first region P1, a second region P2 and a third region P3 respectively (regions are shown as dot lines), the first touch signal line 231 is projected on the first surface 11 as a fourth region (which is the region that the first touch signal line 231 located in FIG. 3), and the fourth region can locate between the first region P1 and the second region P2, or the fourth region can locate between the second region P2 and the third region P3. In the touch display device shown in FIG. 3, the fourth region locates between the second region P2 and the third region P3. Herein, if the fourth region locates between the first region P1 and the second region P2, the fourth region may or may not overlap with the first region P1 and/or the second region P2. Similarly, if the fourth region locates between the second region P2 and the third region P3, the fourth region may or may not overlap with the second region P2 and/or the third region P3.

As shown in FIG. 3, the pixel array structure may further comprise a second touch signal line 232. In addition, in the touch display device shown in FIG. 3, the first touch signal line 231 and the second touch signal line 232 completely overlap with the data line 22. In other embodiment, the first touch signal line 231 or the second touch signal line 232 may partially overlap with the data line 22, but the present disclosure is not limited thereto.

In the touch display device shown in FIG. 3, the second touch signal line 232 is adjacent to the first touch signal line 231, wherein the first touch signal line 231 and the second touch signal line 232 are spaced apart by the pixel unit 41 or by a multiple of the pixel unit 41. Therefore, a better touch performance of the touch display device can be achieved. In this case, "multiple of the pixel unit 41" means a different number of the pixel unit 41 (i.e. two pixel units, or three pixel units etc.). In the touch display device shown in FIG. 3, the first touch signal line 231 and the second touch signal line 232 are spaced apart by the pixel unit 41, which includes the first red unit R1, the first green unit G1 and a blue unit B0. In one embodiment, the pixel unit 41 may comprise a red unit, a green unit, a blue unit and a white unit. In another embodiment, the pixel unit may also comprise other numbers or colors of units, but the present disclosure is not limited thereto.

As shown in FIG. 3, a contact via 231a overlaps with the first touch signal line 231 and the data line 22. In the present embodiment, a low temperature polysilicon (LIPS) thin film transistor units are exemplified as the thin film transistor TFT, but the present disclosure is not limited thereto. Amorphous silicon thin film transistor units, metal oxide (such as IGZO) thin film transistor units, other types of thin film transistor units or a combination of different types of the thin film transistor units mentioned above can also be applied in the touch display device of the present disclosure.

In order to reduce the resistor-capacitor loading (RC loading) of the data line 22, a first width W1 of the data line 22 cannot be too large. In addition, in the touch display device of the present embodiment, a second width W2 of the first touch signal line 231 (i.e. a second width W2 as shown in FIG. 3) is greater than the first width W1 to improve the touch performance of the first touch signal line 231. Hence, in order to decrease the RC loading of the data line 22 and improve the touch performance of the first touch signal line 231, the second width W2 of the first touch signal line 231 in the first direction X is greater than the first width W1 of the data line 22 in the first direction X. The first touch signal line 231 has a first portion and a second portion, the first portion corresponds to the contact via 231a, the second portion connects to the first portion. The first portion has a third width W3 in the first direction X, the second portion has a second width W2 in the first direction X, and the third width W3 is greater than the second width W2 because more space is required for disposing the contact via 231a. However, in other embodiments of the present disclosure, the third width W3 may be similar to the second width W2 due to different process for preparing the touch display device.

Herein, the design of the second touch signal line 232 is similar to that of the first touch signal line 231 and the details are not repeated herein.

Hereinafter, the relations between the color filter structure 4 and the first spacer 71 as well as the second spacer 72 are illustrated in detail. Since the relations between the color filter structure 4 and the first spacer 71 as well as the second spacer 72 in the touch display devices shown in FIGS. 1 and 2 are similar, only the embodiment shown in FIG. 1 is described below.

Figure 4:
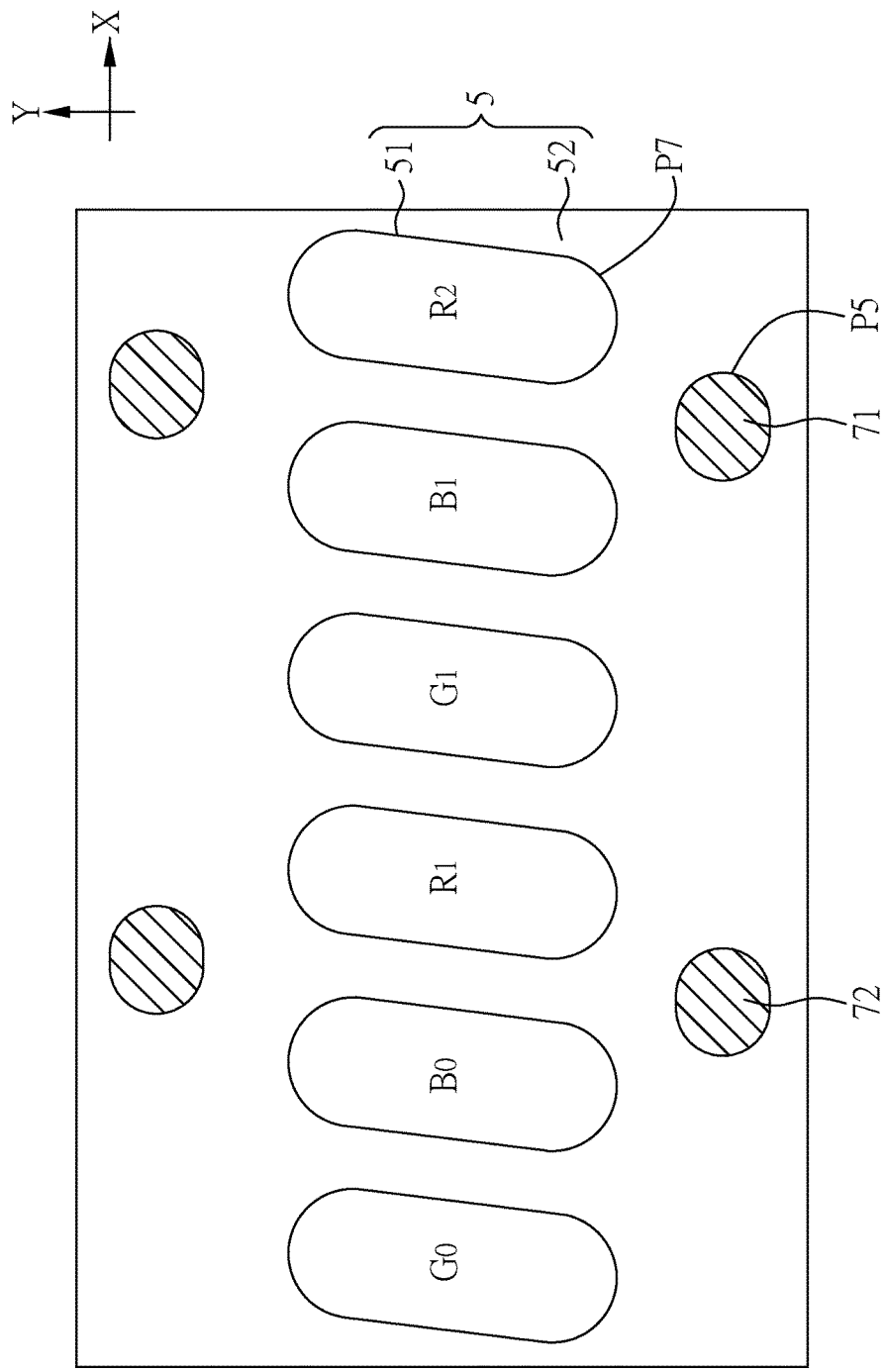
FIG. 4 is a top view showing positions of a black matrix layer and spacers in a touch display device according to one embodiment of the present disclosure.

FIG. 4 is a top view showing positions of a black matrix layer and spacers in a touch display device according to one embodiment of the present disclosure. As shown in FIGS. 1 and 4, a black matrix layer 5 is further disposed on the second substrate 3, wherein the black matrix layer 5 overlaps with the scan line 21, the data line 22, the first touch signal line 231 and the second touch signal line 232, and the black matrix layer 5 has plural openings 51 to expose parts of the pixel units 41. The first spacer 71 and the second spacer 72 are disposed on a light shielding region 52 of the black matrix layer 5. In other words, the first spacer 71 and the second spacer 72 are disposed between the pixel array structure 2 and the second substrate 3. The first spacer 71 is projected on the first surface as a fifth region P5, the opening 51 is projected on the first surface as a seventh region P7, and the seventh region does not overlap with the fifth region. In addition, as shown in FIGS. 1 and 4, the plurality of the pixel units 41 of the color filter structure 4 may further comprise a second pixel unit, the second pixel unit comprises a second red unit R2 adjacent to the first blue unit B1, wherein the first red unit R1, the first green unit G1, the first blue unit B1 and the second red unit R2 are sequentially arranged along the first direction X. The second red unit R2 is projected on the first surface 11 as a sixth region.

As shown in FIG. 1, the fifth region P5 of the first spacer 71 is adjacent to the third region P3 of the first blue unit B1 and the sixth region P6 of the second red unit R2. Herein, only partial second red unit R2 and partial sixth region P6 are shown in FIG. 1. In other words, the fifth region P5 of the first spacer 71 locates corresponding to a boundary between the third region P3 of the first blue unit B1 and the sixth region P6 of the second red unit R2. In the present embodiment or other embodiments of the present disclosure, if the fifth region P5 of the first spacer 71 is adjacent to the third region P3 of the first blue unit B1 and the sixth region P6 of the second red unit R2, the fifth region P5 of the first spacer 71 may or may not overlap with the third region P3 of the first blue unit B1 and/or the sixth region P6 of the second red unit R2. In addition, as shown in FIG. 4, the second spacer 72 is adjacent to the first spacer 71, wherein the first spacer 71 and the second spacer 72 are spaced apart by the pixel unit 41 or by a multiple of the pixel unit 41. In the present embodiment, the first spacer 71 and the second spacer 72 are spaced apart by the first red unit R1, the first green unit G1 and the first blue unit B1. However, the colors of the pixel unit disposed between the first spacer 71 and the second spacer 72 are not limited thereto, and the positions of the spacers can be adjusted if it is necessary.

As shown in FIG. 1, when the touch display device of the present disclosure is manufactured, the pixel array structure 2 is formed on the first substrate 1, wherein the black matrix layer 5, the color filter structure 4, the first spacer 71 and the second spacer 72 are formed on the second substrate 3. Alternatively, as shown in FIG. 2, the pixel array structure 2, the color filter structure 4, the first spacer 71 and the second spacer 72 are formed on the first substrate 1, and the black matrix layer 5 is formed on the second substrate 3.

Then, a display medium layer 6 is disposed between the first substrate 1 and the second substrate 3 to form the touch display device of the present disclosure. However, when producing the touch display devices shown in FIG. 1 or 2, a shift may occurred between the first substrate 1 and the second substrate 3 during assembling of the first substrate 1 and the second substrate 3.

Figure 5:
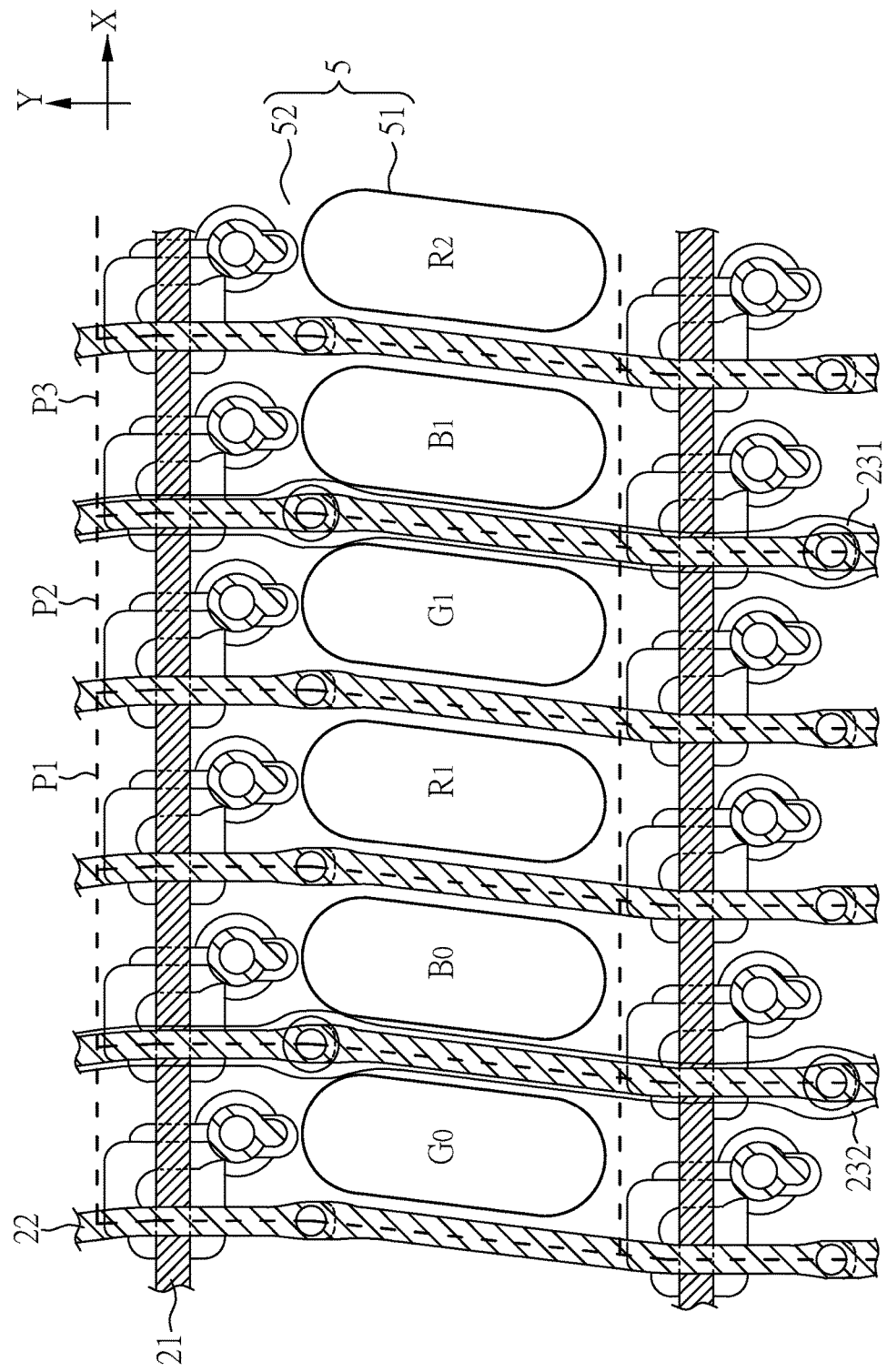
FIGS. 5 and 6 are top views showing a pixel array structure on a first substrate laminated with a black matrix layer on a second substrate in touch display devices according to different embodiments of the present disclosure.
Figure 6:
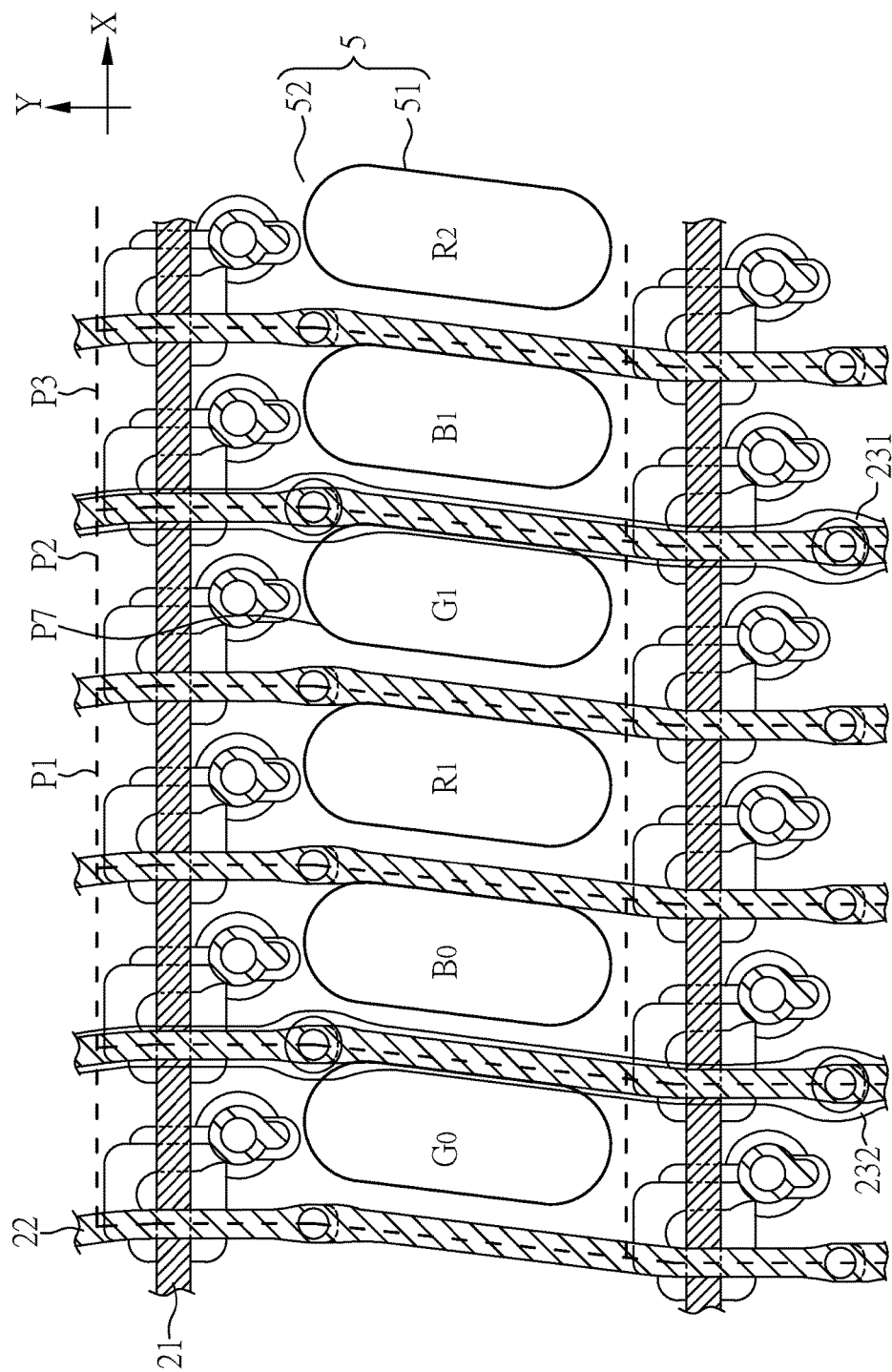

FIG. 5 is a top view showing a pixel array structure on a first substrate laminated with a black matrix layer on a second substrate in touch display devices according to one embodiment of the present disclosure. In an ideal case, when the first substrate 1 and the second substrate 3 are assembled and no shift occurred, the light shielding region 52 of the black matrix layer 5 can completely overlaps with the scan lines 21, the data lines 22, the first touch signal line 231 and the second touch signal line 232. However, the widths of the first touch signal line 231 and the second touch signal line 232 (for example, the second width W2 of the first touch signal line 231 shown in FIG. 3) is greater than the first width W1 of the data line 22 (as shown in FIG. 3). If the shift occurred between the first substrate 1 and the second substrate 3 during assembling of the first substrate 1 and the second substrate 3, parts of the first touch signal line 231 and the second touch signal line 232 may not be covered by the light shielding region 52 of the black matrix layer 5 and be exposed from the openings 51 of the black matrix layer 5, as shown in FIG. 6. In other words, the seventh region P7 of the opening 51 overlaps with the fourth region of the first touch signal line 231. In this case, the exposed parts of the first touch signal line 231 and the second touch signal line 232 may reduce the aperture ratio or the transmittance of the touch display device.

As shown in FIGS. 1 and 2, the first spacer 71 and the second spacer 72 are protrusions in the display medium layer 6, and these protrusions will influence tilts of liquid crystal molecules in the display medium layer 6 resulting in decreasing the transmittance of the touch display device.

In one embodiment of the present disclosure, influence of the first spacer 71 and the second spacer 72 on the transmittance of the touch display device is greater than the influence of the first touch signal line 231 and the second touch signal line 232. Therefore, in the touch display device of the present disclosure, the positions of the first spacer 71 and the second spacer 72 are considered prior to the positions of the first touch signal line 231 and the second touch signal line 232.

Therefore, as shown in FIGS. 1 and 4, in one embodiment of the present disclosure, a projection of the first spacer 71 on the first surface 11 locates corresponding to a boundary between projections of the first blue unit B1 and the second red unit R2 on the first surface 11, and a projection of the second spacer 72 on the first surface 11 locates corresponding to a boundary between the projections of the blue unit B0 and the first red unit R1 on the first surface 11. In this case, the influences of the first spacer 71 and the second spacer 72 on the transmittance of the touch display device can be minimized.

In addition, as shown in FIGS. 1 and 3, in one embodiment of the present disclosure, the first red unit R1, the first green unit G1 and the first blue unit B1 are projected on the first surface 11 as the first region P1, the second region P2 and the third region P3 respectively, and the first touch signal line 231 is projected on the first surface 11 as the fourth region (which is the region that the first touch signal line 231 located in FIG. 3). The fourth region on the first surface 11 projected by the first touch signal line 231 locates between the first region P1 of the first red unit R1 and the second region P2 of the first green unit G1; or the fourth region locates between the second region P2 of the first green unit G1 and the third region P3 of the first blue unit B1. Especially, when the fourth region of the first touch signal line 231 locates between the second region P2 of the first green unit G1 and the third region P3 of the first blue unit B1, the influence of the first touch signal line 231 on the transmittance of the touch display device can be minimized.

Figure 7:
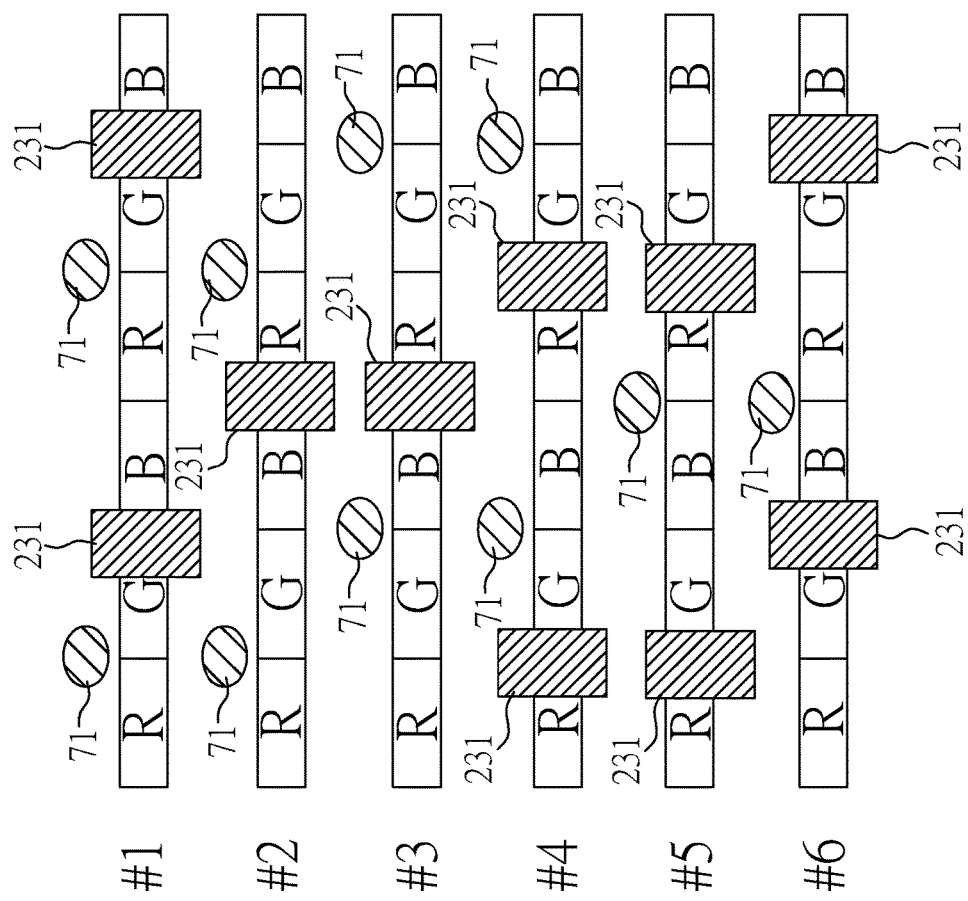
FIG. 7 is a top view showing arrangements of spacers, touch signal lines and color filter structure according to one embodiment of the present disclosure.

Herein, the touch display device shown in FIGS. 1, 3 and 5 are used to simulate the transmittance of the touch display device with different positions of the touch signal lines and the spacers. Especially, the transmittance of the touch display device that the second substrate is right shifted (as shown in FIG. 6) or left shifted (not shown) is simulated herein. The relative positions of the touch signal lines (for example, the first touch signal lines 231), the spacers (for example, the first spacer 71), the red unit (labeled with R), the green unit (labeled with G) and the blue unit (labeled with B) of the color filter structure are shown in FIG. 7. In addition, in the present simulation, 3.0 μm shift is simulated such as shown in FIG. 6 which the first touch signal lines 231 are exposed from the opening 51 of the black matrix layer 5. The simulation result is shown in the following Table 1.

Among visible lights, human eyes are most sensitive to green light and least sensitive to blue light. Therefore, disposing the spacers between the blue unit and the red unit is expected to have less impact on visual perception. The results shown in Table 1 also indicates that the touch display device has the maximum transmittance when the spacer is disposed between the blue unit and the red unit and the touch signal line is disposed between the green unit and the red unit. Moreover, the results shown in Table 1 indicates that the touch display device has the second maximum transmittance when the spacer is disposed between the blue unit and the red unit and the touch signal line is disposed between the blue unit and the green unit.

From the results shown in FIG. 7 and Table 1, the touch display device has a more ideal transmittance when the spacer is disposed between the blue unit and the red unit, and the touch signal line is disposed between the green unit and the blue unit or between the red unit and the green unit.

The touch display devices provided by the aforementioned embodiments can be self-capacitance or mutual-capacitance touch display devices. In addition, in the touch display device shown in FIG. 1, a back light module can be provided below the first substrate 1 to provide light.

TABLE 1

| | | FIG. 7 | | | | | |
|---|---|---|---|---|---|---|---|
| | | #1 Position of the spacer Between the red and green units Position of the touch signal line | | | #2 | | |
| | | Between the green and blue units | | | Between the blue and red units | | |
| | | R | G | B | R | G | B |
| Aperture ratio (%) | Left shift | 38.85% | 39.57% | 47.15% | 37.01% | 40.65% | 46.41% |
| | Right shift | 40.26% | 36.69% | 47.76% | 40.11% | 39.49% | 45.31% |
| Transmittance (%) | Left shift | | 3.32% | | | 3.35% | |
| | Right shift | | 3.16% | | | 3.32% | |

| | | FIG. 7 | | | | | |
|---|---|---|---|---|---|---|---|
| | | #3 Position of the spacer Between the green and blue units Position of the touch signal line | | | #4 | | |
| | | Between the blue and red units | | | Between the red and green units | | |
| | | R | G | B | R | G | B |
| Aperture ratio (%) | Left shift | 47.15% | 38.85% | 39.57% | 46.41% | 37.01% | 40.65% |
| | Right shift | 47.76% | 40.26% | 36.69% | 45.31% | 40.11% | 39.49% |
| Transmittance (%) | Left shift | | 3.35% | | | 3.23% | |
| | Right shift | | 3.34% | | | 3.40% | |

| | | FIG. 7 | | | | | |
|---|---|---|---|---|---|---|---|
| | | #5 Position of the spacer Between the blue and red units Position of the touch signal line | | | #6 | | |
| | | Between the red and green units | | | Between the green and blue units | | |
| | | R | G | B | R | G | B |
| Aperture ratio (%) | Left shift | 39.57% | 47.15% | 38.85% | 40.65% | 46.41% | 37.01% |
| | Right shift | 36.69% | 47.76% | 40.26% | 39.49% | 45.31% | 40.11% |
| Transmittance (%) | Left shift | | 3.76% | | | 3.71% | |
| | Right shift | | 3.76% | | | 3.65% | |

Furthermore, the touch display device provided by the aforementioned embodiment can be applied to any electronic device requiring display screens and touch functions. For example, monitors, mobile phones, laptop computers, video cameras, cameras, music players, mobile navigation devices, televisions, and the likes.

Although the present disclosure has been explained in relation to its embodiment, it is to be understood that many other possible modifications and variations can be made without departing from the spirit and scope of the disclosure as hereinafter claimed.

What is claimed is:

1. A touch display device, comprising:
   a first substrate having a first surface;
   a second substrate disposed corresponding to the first substrate;
   a pixel array structure disposed between the first substrate and the second substrate, wherein the pixel array structure comprises:
     a scan line extending along a first direction;
     a data line extending along a second direction, wherein the scan line and the data line are crossed; and
     a first touch signal line extending along the second direction, wherein the first touch signal line overlaps with the data line; and
   a color filter structure disposed between the pixel array structure and the second substrate;
   wherein the color filter structure comprises a plurality of pixel units, the plurality of pixel units comprise a first pixel unit, the first pixel unit comprises a first red unit, a first green unit and a first blue unit arranging along the first direction, wherein the first red unit, the first green unit and the first blue unit are projected on the first surface as a first region, a second region and a third region respectively, the first touch signal line is projected on the first surface as a fourth region, and the fourth region locates between the first region and the second region, or the fourth region locates between the second region and the third region.

2. The touch display device of claim 1, wherein the first red unit, the first green unit and the first blue unit are sequentially arranged along the first direction.

3. The touch display device of claim 1, wherein the plurality of pixel units further comprise a second pixel unit, the second pixel unit comprises a second red unit, wherein the first red unit, the first green unit, the first blue unit and the second red unit are arranged along the first direction.

4. The touch display device of claim 3, wherein the second red unit is adjacent to the first blue unit.

5. The touch display device of claim 4, further comprising a first spacer disposed between the first substrate and the second substrate, wherein the first spacer is projected on the first surface as a fifth region, the second red unit is projected on the first surface as a sixth region, and the fifth region is adjacent to the third region and the sixth region.

6. The touch display device of claim 5, further comprising a second spacer, the second spacer is adjacent to the first spacer, wherein the first spacer and the second spacer are spaced apart by the pixel unit or by a multiple of the pixel unit.

7. The touch display device of claim 1, wherein the pixel array structure further comprises a second touch signal line, the second touch signal line is adjacent to the first touch signal line, wherein the first touch signal line and the second touch signal line are spaced apart by the pixel unit or by a multiple of the pixel unit.

8. The touch display device of claim 7, further comprising a black matrix layer disposed on the second substrate, wherein the black matrix layer overlaps with the scan line, the data line, the first touch signal line and the second touch signal line.

9. The touch display device of claim 8, wherein the black matrix layer has an opening, the opening is projected on the first surface as a seventh region, and the seventh region overlaps with the fourth region.

10. The touch display device of claim 1, further comprising a contact via which overlaps with the first touch signal line and the data line.

11. The touch display device of claim 10, wherein the first touch signal line has a first portion and a second portion, the first portion corresponds to the contact via, and the second portion connects to the first portion.

12. The touch display device of claim 11, wherein the data line has a first width in the first direction, the second portion of the first touch signal line has a second width in the first direction, and the first portion of the first touch signal line has a third width in the first direction, wherein the second width is greater than the first width.

13. The touch display device of claim 12, wherein the third width is greater than the second width.

14. A display device, comprising:
   a first substrate having a first surface;
   a second substrate disposed corresponding to the first substrate;
   a pixel array structure disposed between the first substrate and the second substrate;
   a color filter structure disposed between the pixel array structure and the second substrate; and
   a first spacer disposed between the pixel array structure and the second substrate;
   wherein the color filter structure comprises a plurality of pixel units, the plurality of pixel units comprise a first pixel unit and a second pixel unit, the first pixel unit comprises a first blue unit, the second pixel unit comprises a second red unit, wherein the first blue unit and the second red unit are arranged along a first direction;
   wherein the first blue unit is projected on the first surface as a third region, the first spacer is projected on the first surface as a fifth region, the second red unit is projected on the first surface as a sixth region, wherein the fifth region is adjacent to the third region and the sixth region.

15. The display device of claim 14, wherein the first pixel unit further comprises a first red unit and a first green unit, wherein the first red unit, the first green unit and the first blue unit are arranged along the first direction.

16. The display device of claim 15, wherein the first red unit, the first green unit and the first blue unit are sequentially arranged along the first direction.

17. The display device of claim 14, further comprising a second spacer, the second spacer is adjacent to the first spacer, wherein the first spacer and the second spacer are spaced apart by the pixel unit or by a multiple of the pixel unit.

18. The display device of claim 14, wherein the pixel array structure comprises a scan line extending along the first direction, and a data line extending along a second direction, and the scan line and the data line are crossed.

19. The display device of claim 18, further comprising a black matrix layer disposed on the second substrate, wherein the black matrix layer overlaps with the scan line and the data line.

20. The display device of claim 19, wherein the black matrix layer has an opening, the opening is projected on the first surface as a seventh region, and the seventh region does not overlap with the fifth region.

* * * * *